Aug. 24, 1965  J. D. SEGREDO  3,202,462
DEFLECTOR DELIVERY CONTROL FOR HARVESTING MACHINES
Filed Oct. 9, 1963
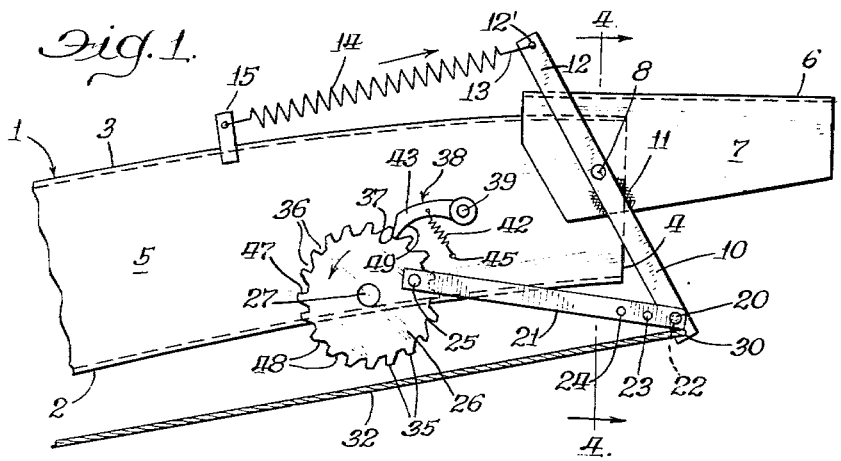
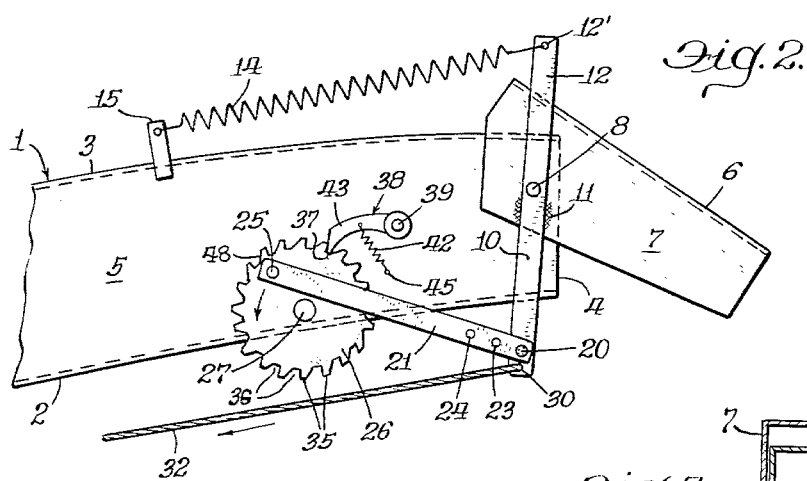
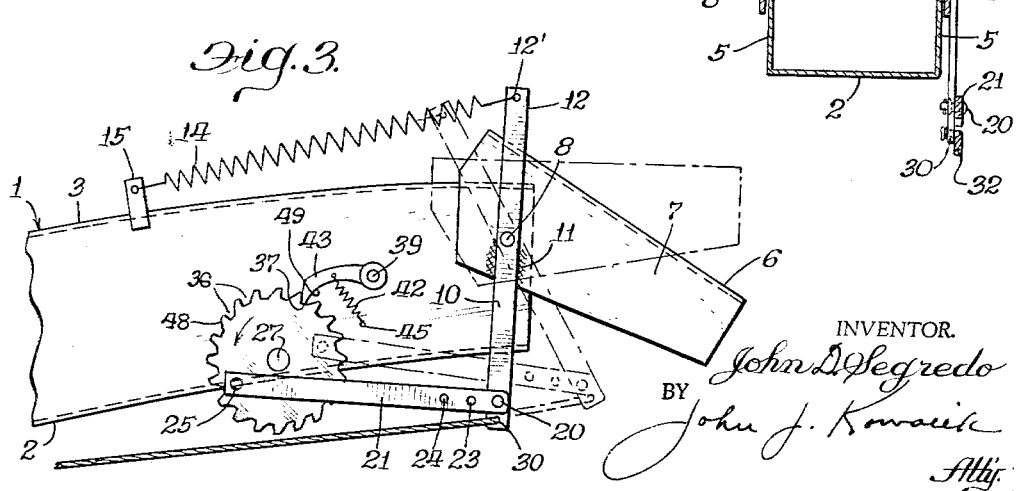
INVENTOR.
John D. Segredo
BY John J. Kowacik
Atty.

United States Patent Office 3,202,462
Patented Aug. 24, 1965

3,202,462
DEFLECTOR DELIVERY CONTROL FOR
HARVESTING MACHINES
John D. Segredo, Chicago, Ill., assignor to International
Harvester Company, Chicago, Ill., a corporation of
New Jersey
Filed Oct. 9, 1963, Ser. No. 315,013
5 Claims. (Cl. 302—61)

This invention relates to controls for the deflectors of crop discharging spouts of harvesters and more specifically to a novel rope-actuated device for controlling the disposition of the deflector.

Harvesting machines have been provided with various deflector controls for controlling the delivery of the discharge spout of such harvester into an associated wagon, silo structure, barn or the like. These various devices generally include a rigid connection or linkage between the deflector and the operator so that the operator may bodily, through the linkage itself, swing the deflector up or down. Rope-pulling devices which relied on the tension of the rope to actuate a mechanism have also been used.

In general these rope-pulling devices have incorporated mechanisms which are either difficult to construct or which have a tendency to malfunction particularly after slight wear. Furthermore, most of these devices are relatively expensive and therefore impractical.

The general object of the invention is to provide a novel deflector delivery control device which is of simple, durable and efficient construction.

A further object of the invention is to provide a novel deflector delivery control device which is actuated by a pull rope and which is self-resetting.

A more specific object of the invention is to provide a novel control device which incorporates a ratchet wheel increment-gauging mechanism which is actuated by a lever structure connected between the discharge spout deflector and the pull rope.

These and other objects and advantages inherent in and encompassed by the invention will become more readily apparent from the specification and the drawings, wherein:

FIGURES 1, 2 and 3 are fragmentary side elevational views of a harvesting machine discharge spout and spout deflector with the novel control mechanism attached thereto;

FIGURE 1 illustrating the spout in its uppermost position;

FIGURE 2 in intermediate position;

FIGURE 3 in its lowermost position preparatory to recycling to its initial position; and FIGURE 4 is a cross-sectional view taken substantially on line 4—4 of FIGURE 1.

Describing the invention in detail and having particular reference to the drawings there is shown a discharge spout generally designated 1, which has a discharge end 2. The spout 1 is a quadrilateral or rectangular section structure which comprises top and bottom walls 3 and 4 and side walls 5, 5 interconnecting the top and bottom walls. The deflector is substantially conventional and is of inverted U-shape and comprises a top wall 6 and sidewalls 7, 7 which respectively overlap the walls 5, 5 and are connected therewith by means of the pivot rivets or pins 8, 8 which are secured thereto.

One of the walls 7 is secured to a lever 10 as by welding at 11, said lever having an intermediate portion pivoted on the pin 8 and having an upper end portion 11 with an eye 12 to which is hooked one end 13 of a tension spring 14, the other end of the tension spring being hooked to an anchor lug 15 which is secured to one of the walls 5 of the duct work. Pivotal movement about the generally horizontal axis is afforded the spout deflector 6 and its controlled by the lever 10 affixed thereto. The deflector 6 is normally biased to an upper position as shown in FIGURE 1 by means of the tension spring 14 which tends to rotate the deflector in a counterclockwise direction as seen in FIGURES 1-3.

The lever 10 is pivoted as at 20 to one end of a ratchet turning bar or link 21 through anyone of a series of holes therein indicated at 22, 23 and 24, said link 21 being pivoted as at 25 to the ratchet wheel 26 eccentrically of the axis rotation of the ratchet wheel 25, said axis represented by the pin 27 which is suitably secured to the adjacent wall 5 of the duct 1. The lower end of the actuating lever 10 is pivotally connected as at 30 to one end of a pull rope 32 which extends to a position for convenient grasp by an operator as will be readily understood by those skilled in the art. The ratchet wheel 26 comprises a series of teeth 35 which define interdental spaces 36 into which there is selectively admitted one end 37 of a locking or holding pawl 38, said holding pawl being pivoted as at 39 to the adjacent wall 5 of the duct and being biased in a direction urging its locking end toward the ratchet wheel by means of a tension spring 42 which is in tension between the arm portion 43 of the holding pawl and connected thereto as at 44 and below the arm to a pin 45 which is mounted on the wall 5. It will be realized that the profile of the teeth 35 is such that the locking edges 47 of the teeth will prevent rotation of the ratchet wheel in a clockwise direction but the ramp sides 48 of the teeth as well as the back edge 49 of the node 37 of the locking pawl is such as will allow the wheel 26 to rotate in a counterclockwise direction pursuant to initial actuation thereof in such direction by the pull on the rope 32 as it is translated through the ratchet turning link 21 to the ratchet wheel in positions when the pivot point 25 is above the dead center position with respect to the pin 27. As well seen in the drawings, actuation of the pull rope 32 in a leftward direction as seen on the drawings will progressively swing the upright lever 10 in a clockwise direction with attendent downward deflection of the deflector spout. The last position of the spout prior to recycling movement is as shown in FIGURE 2, wherein the pivot points 20 and 25 are above dead center with respect to the pivot point or journal axis 27. On the next pull the bar 21 falls below dead center and under these circumstances release of the rope 32 accommodates the contraction of the spring 14 which returns the parts to the position shown in FIGURE 1 wherein point 25 is slightly above dead center with respect to the point 27.

Thus, it will be appreciated that a novel and simple and effective spout deflector control has been provided which is particularly easy to service and which is rugged and durable in construction and positive in action.

I claim:

1. A deflector control for a material-delivering duct having a discharge end, a deflector pivoted to the duct on an axis transverse to the direction of flow of the material, a ratchet wheel journaled to the duct, a crank connected to the ratchet wheel and spaced radially from the axis of rotation thereof, a pitman link pivoted at spaced points to the crank and to said deflector at one side of its axis of pivot, biasing means connected to the duct and to said deflector at a point opposite to the point of connection of the deflector with the pitman link, and a pivoted dog on the chute engaging the ratchet wheel.

2. In a material distributing device, a material delivering structure including a duct with a material discharge opening, a deflector swingably mounted to the structure for movement between uncovering and at least partially covering positions with respect to said opening and presenting a crop-impinging surface angularly to the direction of flow of material from the opening, and means for disposing said deflector in a plurality of selected of said positions comprising ratchet means mounted on the structure, actuator means operatively interconnecting the ratchet means and deflector, and means for conjunctively actuating the ratchet means and deflector said ratchet means comprising a rotary member and said actuator means comprising linkage between the rotary member and deflector and connected to the rotary member at a point eccentric with respect to the axis of rotation of the rotary member whereby rotation of the rotary member changes positions of the linkage and the linkage translates its changing positions to move the deflector.

3. The invention according to claim 2 and biasing means reactively connected between the deflector and structure for returning the deflector from a covering position to an uncovering position.

4. In a material distributing mechanism, a structure duct extending upwardly and terminating in a rearwardly directed discharge opening, a deflector having an inverted U-shaped transverse contour sleeved over the duct in extension thereof and including a top wall and side walls, means pivoting the deflector at said side walls on a transverse generally horizontal axis to the structure for vertical swinging movement disposing said top wall above the discharge opening or inclined downwardly and rearwardly athwart said opening, a ratchet wheel journaled on the structure and having crank means, pitman link means connected to the crank means and to the deflector, means for applying a force on said link means for rotating said ratchet wheel concomitantly with swinging movements of the deflector, a holding dog engaging said ratchet wheel for holding it in selected position, and tensioning means connected between the deflector and the structure for holding the ratchet wheel against the holding dog and biasing said deflector upwardly.

5. In a material distributor, a duct having a vertical side and discharge open end, a deflector pivoted to the duct for swinging movement about a generally horizontal axis across said open end, a lever member connected to the deflector and pivoted coaxially therewith and having an upper end portion above said axis and a lower end portion below the axis, a tension spring connected to said upper end portion of the lever member and to said duct at a point inwardly of said open end and biasing the deflector in an upward direction, a ratchet wheel rotatably mounted on a side of said duct for rotation on a generally horizontal axis and having a crank, a pitman member connected between said crank and said lower end portion of the lever member, a pull rope connected to one of said members for swinging the lever and thus the deflector in a downward direction against the tension of the spring while coincidentally rotating said ratchet wheel, said ratchet wheel having teeth, a holding pawl pivoted on the side of said duct and engaging said teeth to hold said deflector in incremental positions of adjustment, said spring operative to return the deflector to an uppermost position upon said deflector being disposed in a downwardly inclined position whereat said crank is disposed below dead center position with the axis of rotation of the ratchet wheel.

References Cited by the Examiner
UNITED STATES PATENTS 2,670,839 3/54 Aasland _____ 302—61
2,741,512 4/56 Stott _____ 302—61

SAMUEL F. COLEMAN, *Primary Examiner.*

ANDRES H. NEILSEN, *Examiner.*